United States Patent [19]

Botz et al.

[11] Patent Number: 4,575,600
[45] Date of Patent: Mar. 11, 1986

[54] SWITCHING DEVICE

[75] Inventors: Jakob Botz, Ingersheim; Berthold Fein, Bietigheim; Erich Mutschler, Bietigheim; Adam Weber, Bietigheim, all of Fed. Rep. of Germany

[73] Assignee: ITT Industries, Inc., New York, N.Y.

[21] Appl. No.: 621,520

[22] Filed: Jun. 18, 1984

[30] Foreign Application Priority Data

Jun. 24, 1983 [DE] Fed. Rep. of Germany ....... 3322775

[51] Int. Cl.[4] .............................................. H01H 9/02
[52] U.S. Cl. ..................................... 200/293; 200/294
[58] Field of Search .................... 200/47, 61.58, 61.81, 200/61.82, 81.4, 82 C, 84 C, 133 T, 293, 294, 295, 296, 303, 307, 332, 310

[56] References Cited

U.S. PATENT DOCUMENTS

| 2,875,287 | 2/1959 | Van Sickle | 200/153 T X |
|---|---|---|---|
| 3,154,659 | 10/1964 | Flanagan, Jr. et al. | 200/293 X |
| 3,156,805 | 11/1964 | Baker et al. | 200/310 |
| 3,290,475 | 12/1966 | Bross | 200/293 |
| 3,566,053 | 2/1971 | Gause | 200/153 T X |
| 4,048,455 | 9/1977 | Forsythe et al. | 200/81.4 |
| 4,429,200 | 1/1984 | Glenn et al. | 200/293 X |
| 4,453,062 | 6/1984 | Brown et al. | 200/153 T X |
| 4,467,155 | 8/1984 | Grudzien, Jr. et al. | 200/82 C |

Primary Examiner—J. R. Scott
Attorney, Agent, or Firm—James B. Raden; William J. Michals

[57] ABSTRACT

A switch with fastening holes in its housing is stably mounted on the web of a switching device. A plastics fastening element is used, which has three portions with differing diameters and which are inserted with press-fit in the fastening hole of the switch, on opposite sides of the switch, in receiving bores of webs aligned parallel to one other.

9 Claims, 3 Drawing Figures

SWITCHING DEVICE

BACKGROUND OF THE INVENTION

This invention relates to a switching device such as a microswitch or the like, which is secured on a web of associated switch apparatus.

Currently known microswitches utilize housings which have through-bore fastening holes so that this switch can be secured on a web of a support by means of a screw. The diameter of the screw is smaller than the diameter of the fastening hole so that the switch is not rigidly fastened on the web at least when the screw is not tightened firmly. Due to the fact that the switch housing is usually made of plastics material and in order not to damage the switch housing the screw cannot be tightened to the extent required. Further, the mounting of a fastening screw is relatively complicated and time-consuming. Similar disadvantages occur when a rivet is used as a fastening element instead of the screws. Also here the switch can be slightly displaced relative to the support when acted upon by a larger force, because the tolerance of the diameter of the rivet shaft has to be smaller than the diameter of the fastening holes.

Therefore it can be stated that in the prior art the switch is not secured on the support in a sufficiently stable manner. If this switch is actuated by an adjusting member which is displaceably mounted relative to the support, the switching points of the switch change, if the switch is displaced relative to the support in the switching direction.

The invention is therefore based on the problem of creating a fastening for a switch of this kind in which permits an easy mounting and at the same time endures larger forces acting upon the switch, so that the switch is held in exactly the prescribed position even after extended service periods and thus the switching points remain within the given tolerances.

At first it is essential for the present invention that now the fastening element is supported on both sides of the switch. Thus tilting movements of this fastening element transversely to its axis are prevented which would be possible with the known embodiments when, for example, the screw connection would be slightly loosened. Furthermore it is essential for the present invention that the fastening element is pressed with press-fit both in the receiving bores of the two webs and in the fastening hole of the switch housing. Thus tilting movements of the switch relative to the axis of this fastening element are also prevented. Moreover, the design of the present invention has the advantage over the prior art that the assembly is considerably simplified.

The fastening element as such is also clearly secured in the axial direction by the intended press-fits. Nevertheless it can happen that, upon exertion of great forces, the switch is displaced in the axial direction of this fastening element. This deficiency can be cured by providing compensating ribs on a wall of the switch housing or on a web, so that the switch housing is so-to-speak seated with press-fit between the two webs. Alternatively or additionally the switch housing can, in an advantageous development according to the invention, be clamped between the first web and a first portion of the fastening element, when the fastening element is reliably secured against displacement in the axial direction. This can, for example, be realised in that holding ribs are formed out of the web, which holding ribs are pressed on the free front surface of the fastening element.

BRIEF DESCRIPTION OF THE DRAWING

The invention and further advantageous embodiments are described below by way of the embodiment shown in the accompanying drawing, in which.

DETAILED DESCRIPTION

Figure 1:
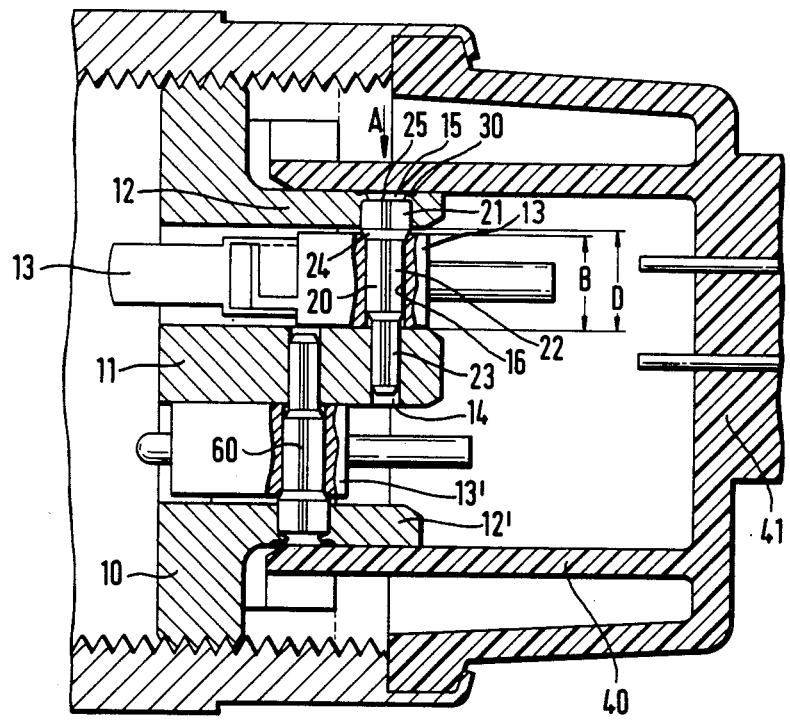
FIG. 1 is a partial section through a switching device in according with the present invention.

In FIG. 1 a support, which is preferably zinc-diecast, is designated 10. On this support are integrally formed a first web 11 and a second web 12. The two webs 11 and 12 are parallel to each other and arranged at a spacing in such a way that between them there is space for receiving a switch as a whole designated 13. The webs 11 and 12 are provided with receiving bores 14 and 15, which are arranged coaxially opposite each other. The housing of the switch 13 has also at least one through-going fastening hole 16. As the drawing shows the diameters of these receiving bores and of the fastening hole are different. The diameter of the receiving bore 14 in the first web 11 is smaller than the diameter of the fastening hole 16 and the diameter of this fastening hole 16 is once again smaller than the diameter of the receiving bore 15 in the second web.

Accordingly, the fastening element 20 has three portions 21, 22 and 23 of differing diameters. This fastening element 20 is pressed into the receiving bore 15 of the second web 12, into the fastening hole 16 in the switch 13 and into the receiving bore 14 in the first web 11 in the direction of arrow A. As the drawing shows the portion 21 of the fastening element 20 having the largest diameter is seated with press-fit in the receiving bore 15. The second portion 22 of the fastening element 20 with a slightly smaller diameter is seated with press-fit in the fastening hole 16 and the third portion 23 of the fastening element having the smallest diameter is fittingly seated in the receiving bore 14 in the first web 11.

Thus in the embodiment according to the invention the fastening element 20 is clearly and stably supported on both sides to the left and to the right of the switch 13 on the two webs 11 and 12. In addition the switch 13 is stably anchored on this fastening element 20, because the central portion 22 is fitted with press-fit in the fastening hole 16. Due to the fact that the diameter of the fastening element is set off several times it is prevented that, for example when the fastening element 20 is put through the receiving bore 15, the generated surface of the fastening element is abrased if, due to unavoidably differing tolerances the diameter of this receiving bore 15 were slightly smaller than the diameter of the receiving bore 14 in the opposite first web 11.

FIG. 1 shows that the spacing D between the first and the second web is slightly larger than the width B of the switch housing. On grounds of tolerance this is practically unavoidable if one does not wish to risk that, upon inserting an overly large switch between the two webs the switch housing is damaged. Thus a displacement of the switch 13 along the axis of the fastening element 20 would be possible theoretically. This is however prevented by clamping the housing of the switch 13 between the first web 11 and the first portion 21 of the fastening element. Thus in practice the fastening element 20 will be pressed in so far that the possibly slanting flange 24 in the first portion 21 presses against the housing wall of the switch and thus presses the switch 13 against the first web 11. This is possible, because the length of the portion 22 in the middle of the fastening element 20 is smaller than the width B of the switch housing. In order to prevent that the switch can displace together with the fastening element 20 it is axially secured. In the embodiment according to FIG. 1 the fastening element 20 is therefore clamped in the receiving bore 15 of the second web 12. One can see from FIG. 1 that the length of the first portion 21 of this fastening element is smaller than the length of the receiving bore 15 in the second web, so that from this second web 12 holding ribs 30 are formed out on the side facing the switch and that these holding ribs are pressed on the free front surface 25 of the fastening element in order to secure it in the axial direction.

In the embodiment according to FIG. 1 a further switch 13' is fastened on the support 10. For this purpose a further web 12' is provided which extends in parallel to and at a spacing from the first web 11. In this connection it is pointed out that, in comparison with the prior art, the embodiment according to the invention has the advantage that the two switches 13 and 13' can be arranged opposite to each other on the first web 11 and thereby both rest against the said web 11, because the fastening element does not project from the receiving bore 14 of the first web 11 on the opposite side.

Figure 2:
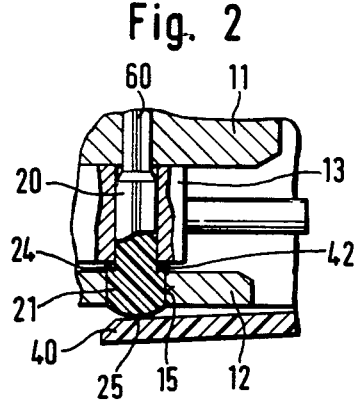
FIG. 2 is a section through part of another embodiment of the present invention; and, FIG. 3 is a section through part of a third embodiment of the switching device in accordance with the present invention.

FIG. 2 shows a partial section through another embodiment of the invention. In this case the length of the first portion 21 of the fastening element is greater than the length of the receiving bore 15 in the second web, so that the front surface 25 of the fastening element 20 projects from this second web 12. Now a flexible tongue 40 serves as an axial safety device. This flexible tongue presses on the crowned front surface 25 of the fastening element 20. This flexible tongue is preferably integrally formed on the cap 41 which may be connected with the support and which has been indicated in FIG. 1. Moreover, one can see that in the embodiment according to FIG. 2 on the flange 24 of the first portion of the fastening element 20 are formed tongues 42 or a circumferential collar which press against the wall of the switch housing. Thereby a better compensation for play is achieved than in the embodiment according to FIG. 1 in case, on grounds of tolerance, the housing walls of the switch 13 does not extend exactly perpendicularly to the axis of the fastening element 20.

Figure 3:
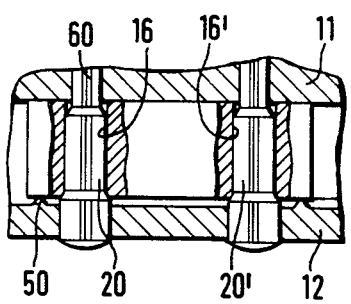

From FIG. 3 can eventually be seen that the switch is held on the support 10 via two fastening elements 20 and 20'. This is necessary to prevent that the switch rotates about the axis of the fastening element if acted upon by greater forces. Furthermore it has been indicated in the embodiment according to FIG. 3 that compensating ribs 50 can be formed on one wall of the web 12, so that the switch can be inserted between the two webs with press-fit.

The embodiments shown in the drawing have their fastening element 20 made of plastics material which may be glass-fibre reinforced. The fastening element 20 has thereby compensating ribs 60 projecting from the generated surface and extending in the longitudinal direction, through which compensating ribs the press-fit is realised. Thus in practice the diameter of the various portions of the fastening element is slightly smaller than the diameter of the corresponding receiving bores or of the fastening hole, however the compensating ribs 60 regularly distributed on the perimeter project so far from the generated surface that the effective outer diameter of the single portions is slightly larger than the diameter of the corresponding receiving bores. In this manner is ensured a particularly reliable seat free from play even if the single receiving bores were not adjusted exactly coaxially relative to each other.

The embodiment shown in the drawing can, of course, be modified. So, for example, the compensating ribs 60 could be arranged on the receiving bores 14 and 15 or on the fastening hole and the fastening element 20 could then have a smooth generated surface. The compensating ribs 50 could also project from a wall of the housing of the switch 13.

Finally it is pointed out that the webs 11 and 12 can be provided with several receiving bores in such a way that, without additional working steps, switches with different spacings between the fastening holes 16 and 16' (compare FIG. 3) may be secured on the support.

In the switching device according to the present invention the switches are accurately mounted and fastened and the switch is no longer displaced in the direction it is actuated, namely perpendicularly to the direction of arrow A, even after an extended service time. Moreover, the switching device is simpler and can be manufactured less expensively than the switching devices according to the prior art having a screw or a rivet as fastening elements.

What is claimed is:

1. A switching device comprising:
   a support and at least one switch having a housing, said housing having at least one through-bore fastening hole defining a diameter, wherein the switch is laterally held on a first web of the support by at least one fastening element, said fastening element projecting through the fastening hole into a receiving bore in the first web;
   a second web projecting from the support at a spacing parallel to the first web, said second web having a receiving bore coaxially arranged to the receiving bore of the first web;
   wherein the receiving bore in the first web has a diameter smaller than the diameter of said fastening hole, and the receiving bore in the second web has a diameter larger than the diameter of the fastening hole in the switch;
   and wherein the fastening element includes three portions with differing diameters, wherein the first portion with the largest diameter is press-fitted into the receiving bore of the second web, the second portion, is press-fitted into the fastening hole of the switch and the third portion with the smallest diameter is press-fitted into the receiving bore of the first web.

2. A switching device according to claim 1, wherein compensating ribs project between the wall of the housing of the switch and the web.

3. A switching device according to claim 2, wherein the housing of the switch is clamped between the first web and the first portion of the fastening element and the fastening element is secured from displacement in the axial direction.

4. A switching device according to claim 3, wherein the length of the portion in the middle of the fastening element is smaller than the width of the switch housing and a protrusion of the first portion rests against one housing wall of the switch.

5. A switching device according to claim 4, wherein the said fastening element includes a free front surface, the length of the first portion of said fastening element is smaller than the length of the receiving bore in the second web and, on the side facing the switch, holding ribs are formed out of the second web and, in order to axially secure the fastening element, are pressed on the free front surface of the fastening element.

6. A switching device according to claim 4, wherein said fastening element includes a free front surface, the length of the first portion of the fastening element is larger than the length of the receiving bore in the second web and, in order to secure this fastening element axially, a flexible tongue presses upon the free front surface of the fastening element, said flexible tongue being integrally formed with a cap connected with the support.

7. A switching device according to claim 1, wherein the fastening element has compensating ribs which project longitudinally from its generated surface.

8. A switching device according to claim 1, including first compensating ribs projecting into the receiving bores in the webs, and second compensating ribs projecting in the fastening hole on the switch.

9. A switching device according to claim 8 wherein the fastening element is preferably made of a glass-fibre reinforced plastics material.

* * * * *